(12) United States Patent
Huynh et al.

(10) Patent No.: US 11,486,477 B2
(45) Date of Patent: Nov. 1, 2022

(54) SYSTEM AND METHOD FOR MONITORING THE REMAINING USEFUL LIFE OF A BALL SCREW IN ACTUATION SYSTEM

(71) Applicant: The Boeing Company, Chicago, IL (US)

(72) Inventors: Neal Huynh, Bellevue, WA (US); David Blanding, Anderson, SC (US); Jimmy Quiambao, Walnut, CA (US); Jeffrey Coffman, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 594 days.

(21) Appl. No.: 16/565,710

(22) Filed: Sep. 10, 2019

(65) Prior Publication Data

US 2021/0071742 A1  Mar. 11, 2021

(51) Int. Cl.
| | | |
|---|---|---|
| *F16H 25/20* | (2006.01) | |
| *F16H 25/22* | (2006.01) | |
| *H02K 11/24* | (2016.01) | |
| *G01L 5/00* | (2006.01) | |
| *G07C 5/08* | (2006.01) | |
| *B64C 13/28* | (2006.01) | |
| *B64D 45/00* | (2006.01) | |

(52) U.S. Cl.
CPC ......... *F16H 25/2015* (2013.01); *B64C 13/28* (2013.01); *F16H 25/2204* (2013.01); *G01L 5/0061* (2013.01); *G07C 5/0808* (2013.01); *H02K 11/24* (2016.01); *B64D 2045/0085* (2013.01); *F16H 2025/2078* (2013.01)

(58) Field of Classification Search
CPC ............. F16H 25/2015; F16H 25/2204; F16H 2025/2078; F16H 25/2021; F16H 2057/016; F16H 57/01; F16H 25/2214; B64C 13/28; G01L 5/0061; G07C 5/0808; H02K 11/24; B64D 2045/0085
See application file for complete search history.

(56) References Cited

U.S. PATENT DOCUMENTS

| | | |
|---|---|---|
| 7,834,494 B2 | 11/2010 | Blanding et al. |
| 8,450,894 B2 | 5/2013 | Blanding et al. |
| 2019/0048988 A1* | 2/2019 | Besser .................... F16H 57/01 |
| 2019/0127049 A1 | 5/2019 | Blanding et al. |

* cited by examiner

Primary Examiner — Michael V Kerrigan
(74) *Attorney, Agent, or Firm* — Coats & Bennett, PLLC

(57) ABSTRACT

A method for monitoring remaining useful life (RUL) of an actuation system in a vehicle that includes receiving position data of the actuation system from a position sensor, maintaining a total distance traveled for the actuation system, and calculating the RUL of the actuation system. The calculating includes estimating force data using an output variable estimator, determining motor torque, weighing the estimated force data using a confidence level, predicting a total life of the actuation system based on the weighted force data, and comparing the predicted total life with the total distance traveled to determine the remaining useful life.

20 Claims, 10 Drawing Sheets

SYSTEM AND METHOD FOR MONITORING THE REMAINING USEFUL LIFE OF A BALL SCREW IN ACTUATION SYSTEM

TECHNOLOGICAL FIELD

The present disclosure relates generally to the field of monitoring the remaining useful life (RUL) in an actuation system. More specifically the present disclosure relates to the field of monitoring the health of a ball screw in a high-lift control system or horizontal stabilizer control system.

BACKGROUND

In any mechanical device, wear and tear is a fact of life. For purposes of safety and efficiency, determining whether a device is within acceptable parameters allows for timely maintenance and replacement. Preventative and predictive maintenance can ensure less downtime, but it depends on the forecasted likelihood of failure, which does not account for outlying equipment that can either underperform, causing issues for an operator, or outperform, requiring expenditures when unnecessary.

Various vehicles, e.g. aircraft, buses, trains, and ships, use actuators to perform many functions during operation of the mobile platform. For example, aircraft utilize actuators to control the movement of flaps, spoilers and ailerons in each wing during operation of the aircraft. Actuators in the tail of an aircraft control the rudder and elevators, while actuators in the fuselage open and close the doors that cover the landing gear bays. Additionally, actuators are utilized to raise and lower the landing gear of the aircraft and actuators on each engine control thrust reversers by which the plane is decelerated.

A ball screw is a mechanical linear actuator that translates rotational motion to linear motion. A threaded shaft provides a helical raceway for ball bearings which act as a precision screw. As well as being able to apply or withstand high thrust loads, they can do so with minimum internal friction. They are made to close tolerances and are therefore suitable for use in situations in which high precision is necessary. The ball assembly acts as the nut while the threaded shaft is the screw.

Conventional high-lift systems and horizontal stabilizers control system predominantly use a ball screw to position these control surfaces. Currently the system maintenance test is to identify the ball screw or other system components should be replaced at regularly scheduled overhaul. In practice, any deficient seal design or contaminated grease or variations of load conditions will cause premature wear on ball screw and ball nut which affects vehicle dispatch reliability and inflight failures. To detect the health of a ball screw actuator, additional sensors and/or other hardware can be added, but this solution can increase costs and maintenance.

SUMMARY

According to one aspect of the present application, a method is disclosed, with the apparatus including receiving position data of the actuation system from a position sensor. The method further includes maintaining a total distance traveled for the actuation system. The remaining useful life of the actuation system is calculated, wherein the calculating includes estimating force data using an output variable estimator. The calculating also includes determining motor torque. The calculating further includes weighing the estimated force data using a confidence level. The calculating additionally includes predicting a total life of the actuation system based on the weighted force data. The calculating further includes comparing the predicted total life with the total distance traveled to determine the remaining useful life.

According to further aspects, the determining motor torque and weighing the estimated force are part of a Kalman estimator.

According to further aspects, disclosed methods further include a cubic mean load equation derived from the position data and the force data associated with the confidence level.

According to further aspects, disclosed methods further include real-time position data as the received position data.

According to further aspects, disclosed methods include the continuous receiving of position data when the actuation system is in use.

According to further aspects, disclosed methods include the calculating of the RUL when the actuation system is not in use.

According to further aspects, disclosed methods include the calculating further including injecting faults.

According to further aspects, disclosed methods include the calculating further including determining a velocity based on the position data.

In another aspect, the present application discloses a system including a position sensor for determining position data of an actuation system; an onboard computing device for maintaining a total distance traveled for the actuation system; and a diagnostic computing device for calculating the RUL of the actuation system. The diagnostic computing device calculation includes estimating force data, determining motor torque, weighing the estimated force data using a confidence level, predicting a total life of the actuation system based on the weighted force data, and comparing the predicted total life with the total distance traveled to determine the remaining useful life.

According to another aspect, the diagnostic computing device uses a Kalman estimator to determine the RUL of the actuation system.

According to another aspect, the confidence level is associated with a cubic mean load equation derived from the position data and the force data.

According to further aspects, the received position data is real-time position data.

According to another aspect, the actuation system is included in a vehicle, which also includes the position sensor and the onboard computing device.

According to another aspect, the vehicle does not include the diagnostic computing device.

In another aspect, the present application discloses a computer-readable storage medium, which is non-transitory and having computer-readable program code that causes an apparatus to receive position data from a position sensor of an actuation system, maintain a total distance traveled for the actuation system, and calculate the RUL of the actuation system. The calculating includes estimating force data using an output variable estimator, determining motor torque, weighing the estimated force data using a confidence level, predicting a total life of the actuation system based on the weighted force data, and comparing the predicted total life with the total distance traveled to determine the remaining useful life.

According to further aspects, the determining motor torque and weighing the estimated force data are part of a Kalman estimator.

According to further aspects, the confidence level is associated with a cubic mean load equation derived from the position data and the force data.

According to further aspects, the received position data is real-time position data.

In another aspect, position data is continuously received when the actuation system is in use.

According to further aspects, the RUL is calculated when the actuation system is not in use.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
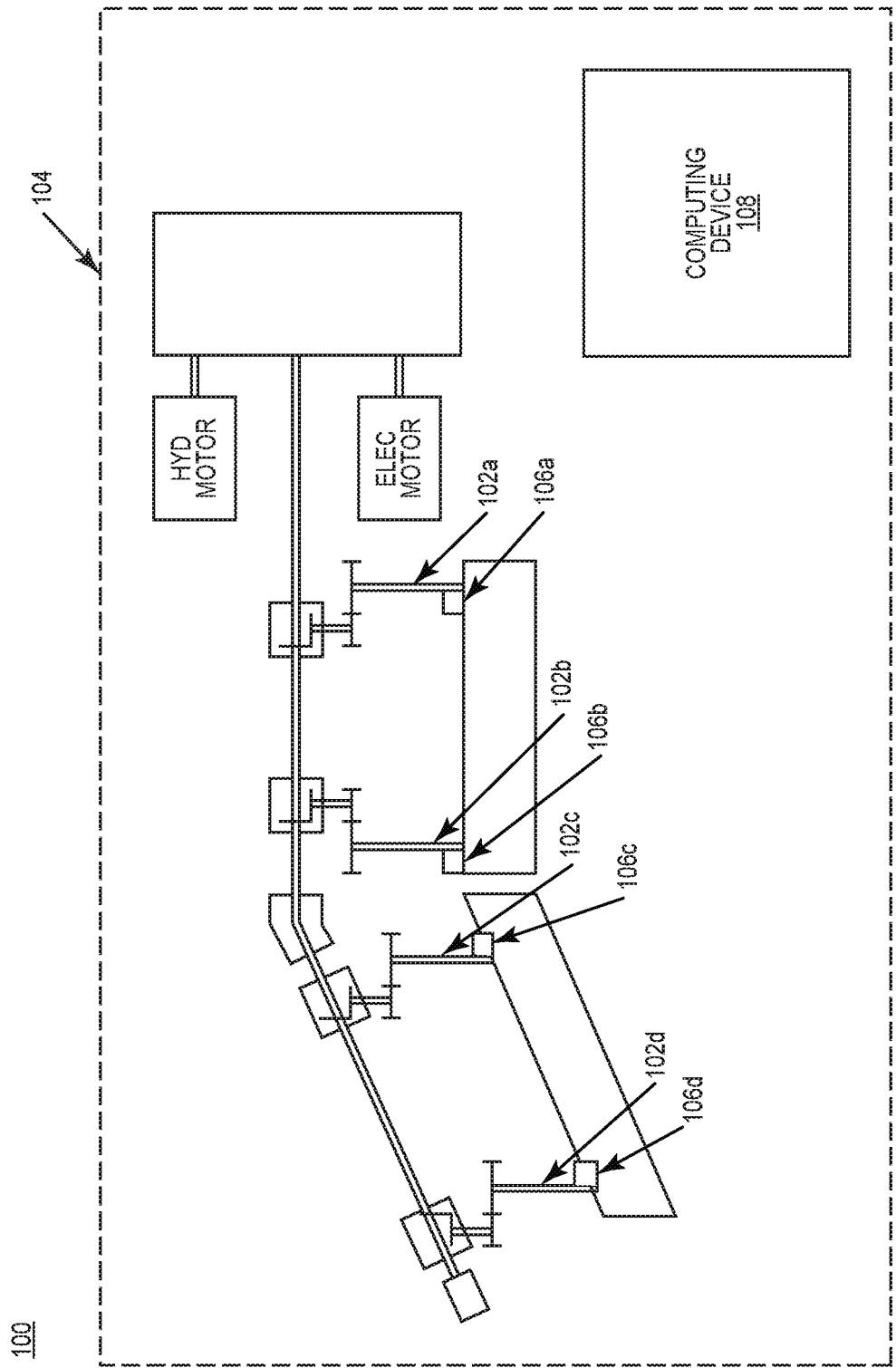

Having thus described variations of the disclosure in general terms, reference will now be made to the accompanying drawings, which are not necessarily drawn to scale, and wherein:

FIG. 1 is an illustration of a system for monitoring a ball screw actuator.

Figure 2A:
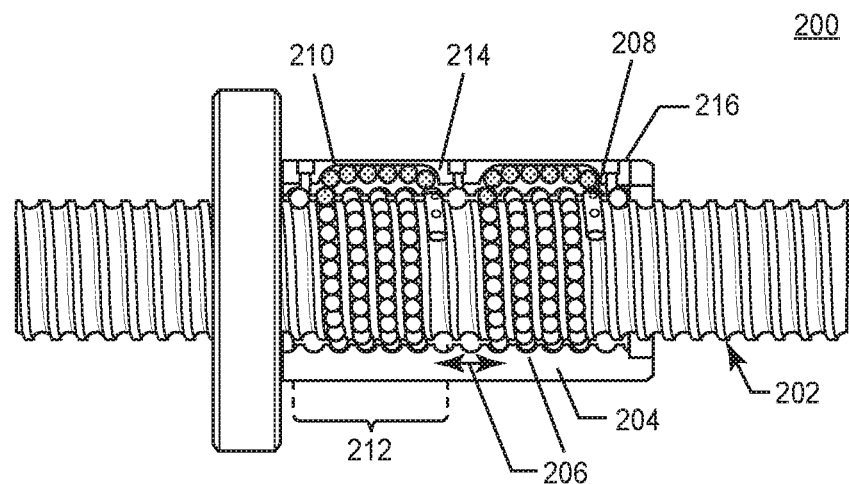

FIG. 2A is a ball screw system with an internal ball return system.

Figure 2B:
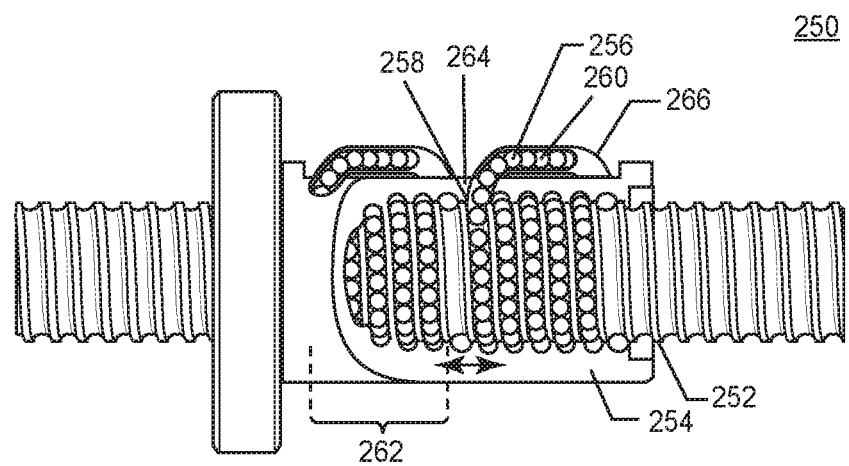

FIG. 2B is a ball screw system with an external ball return system.

Figure 3:
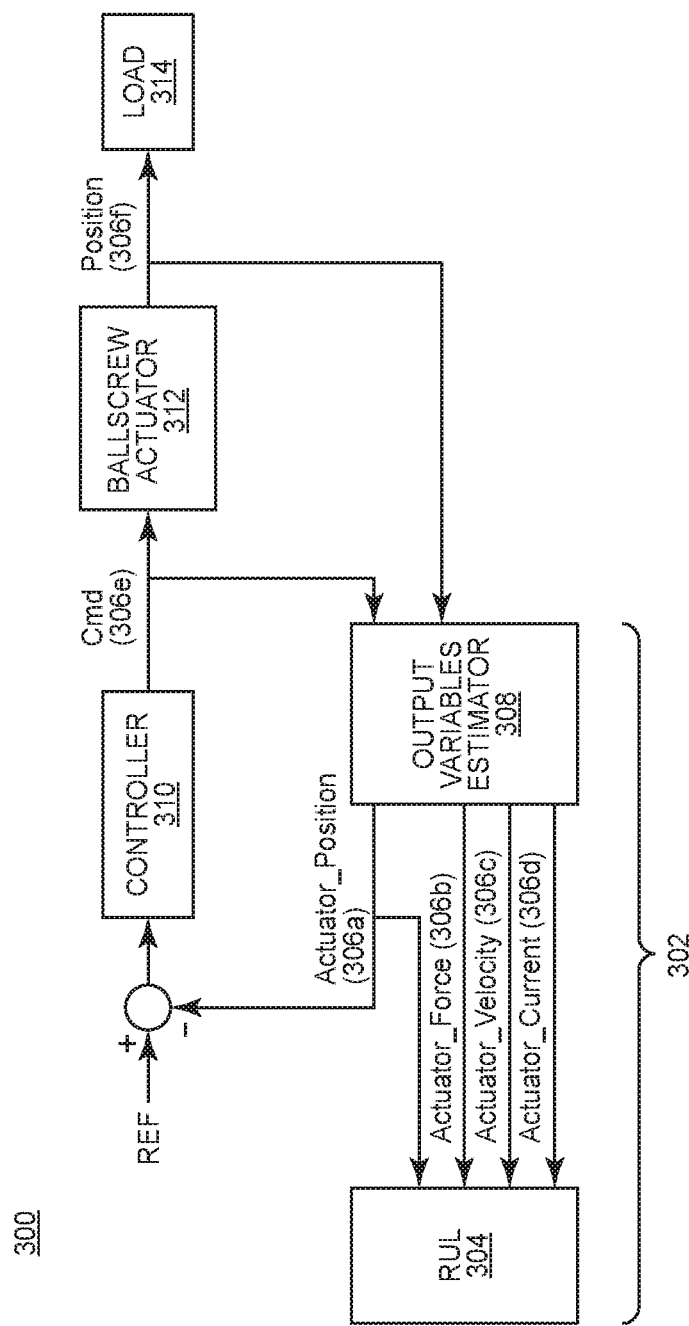

FIG. 3 is a block diagram of a RUL estimator.

Figure 4:
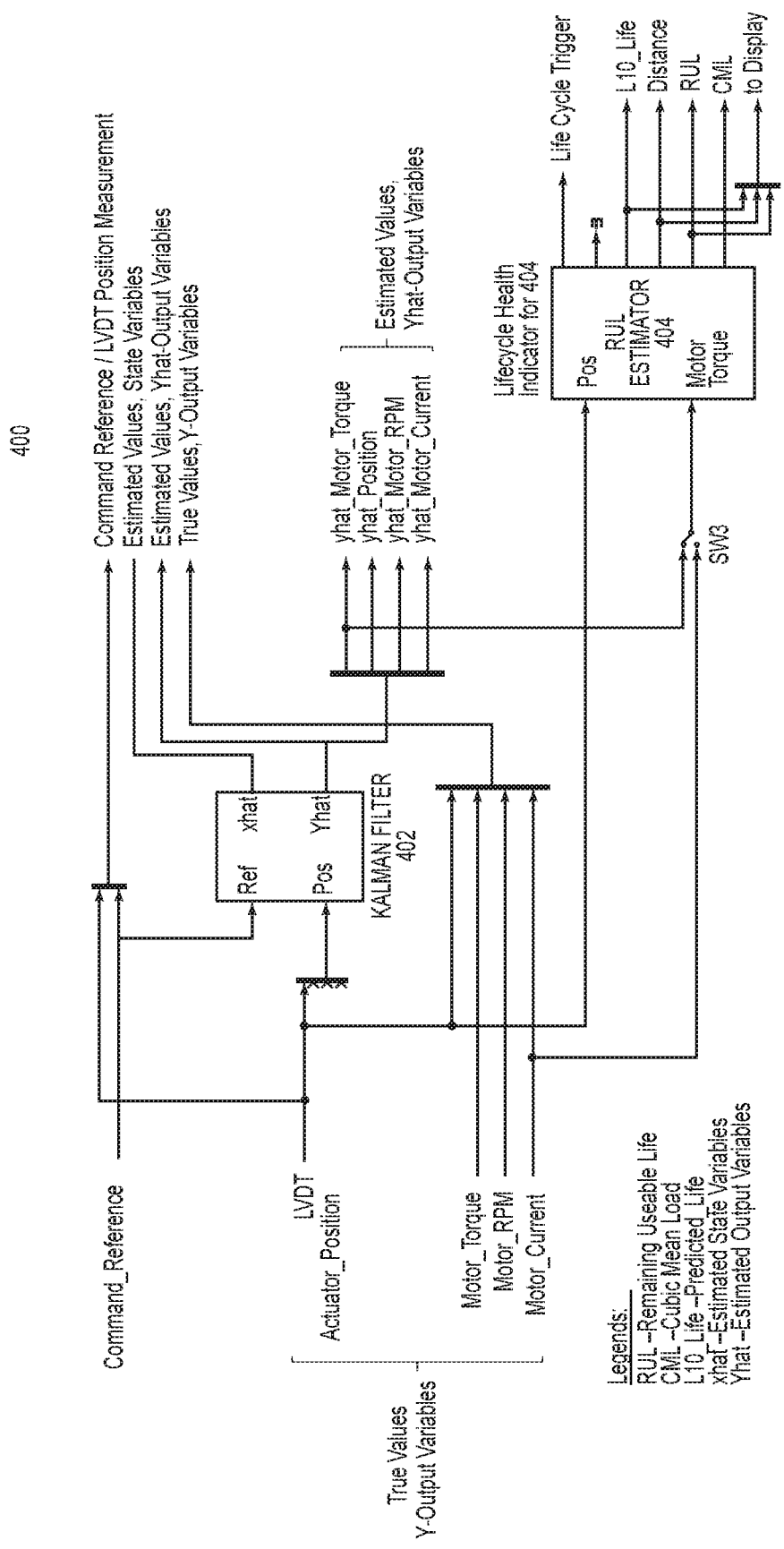

FIG. 4 is a block diagram of a load RUL estimator with a Kalman estimator.

Figure 5:
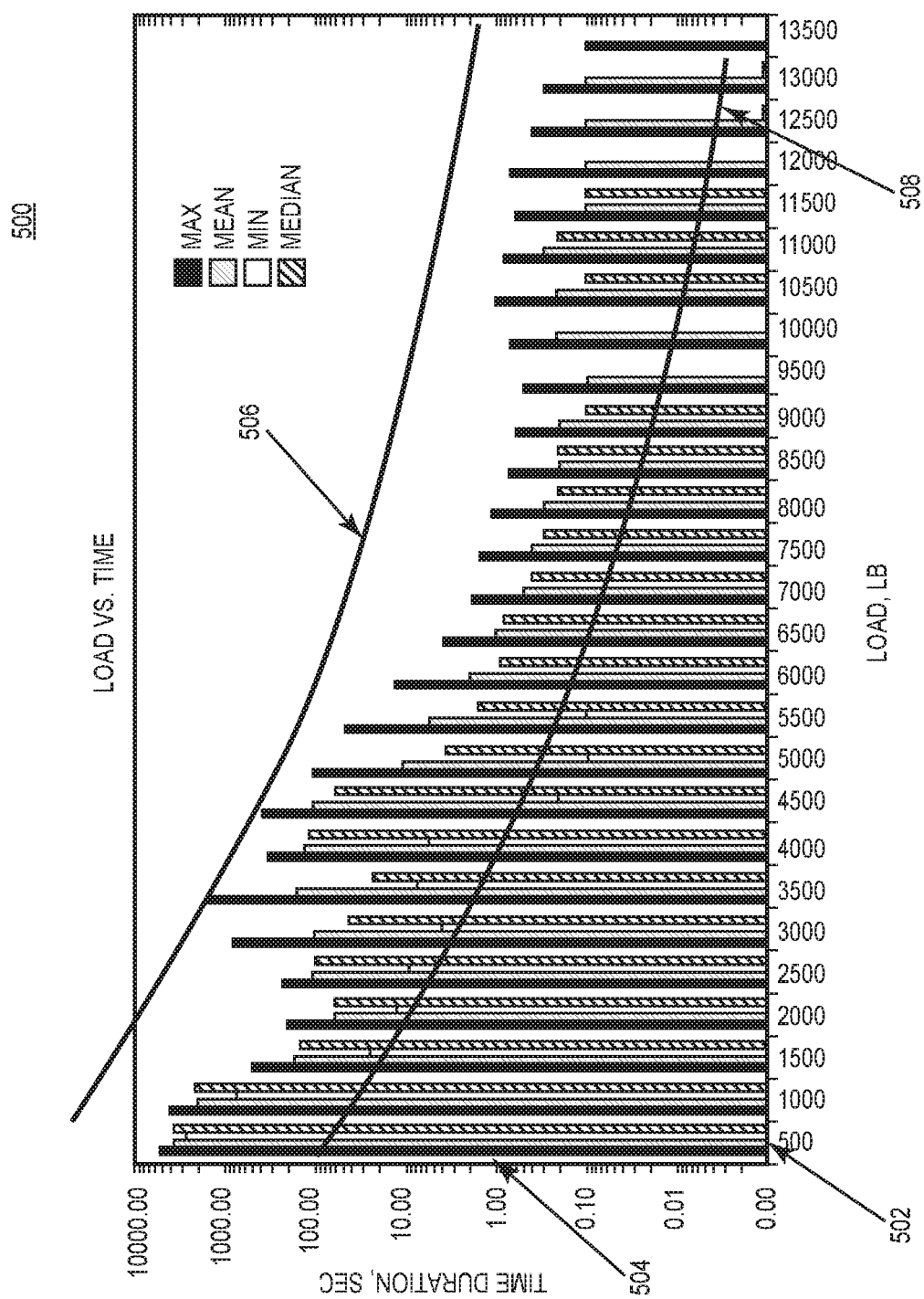

FIG. 5 is a graph showing a duty cycle for a ball screw actuator.

Figure 6:
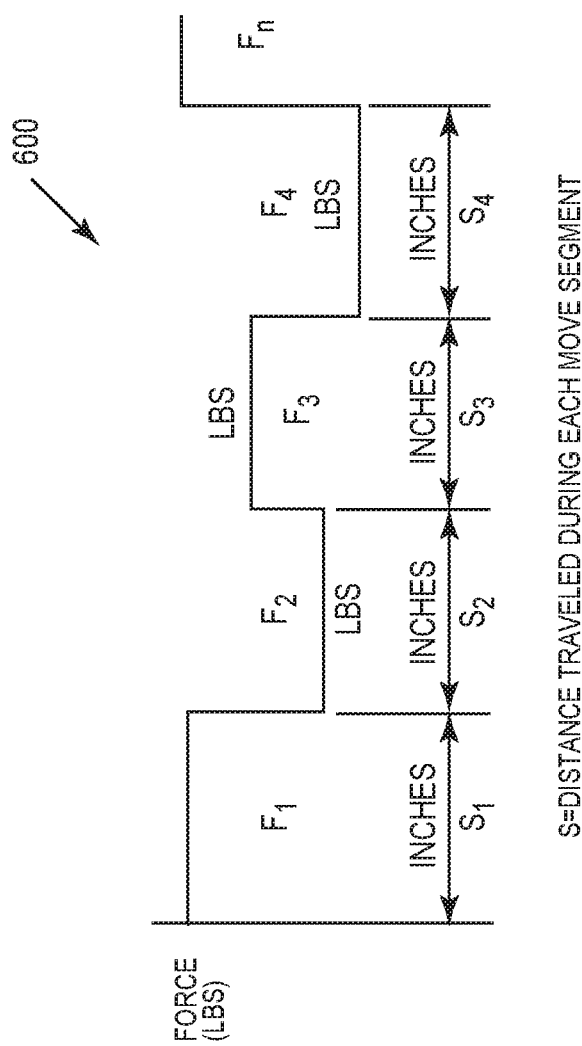

FIG. 6 is a diagram of the force on a ball screw actuator per distance.

Figure 7:
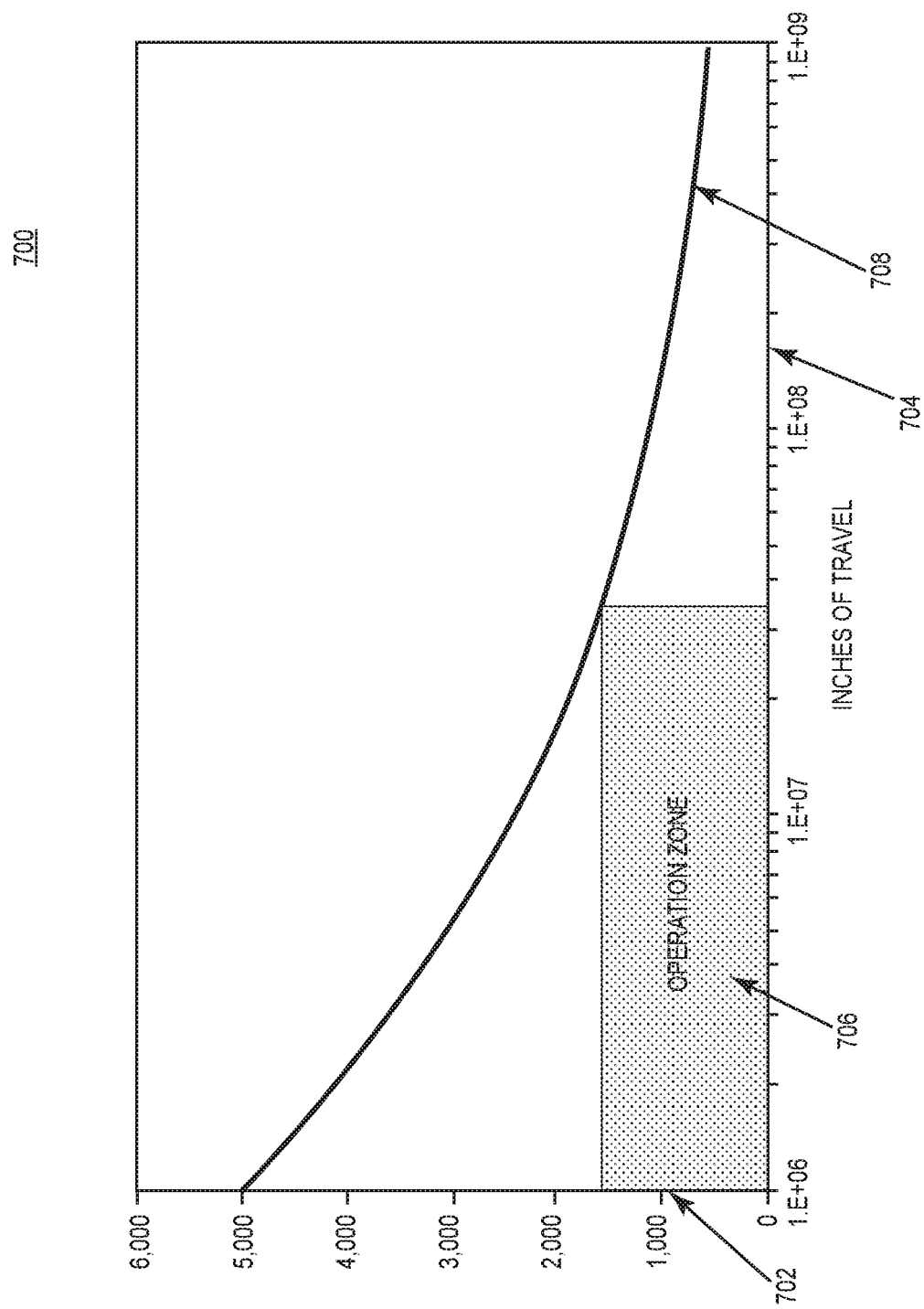

FIG. 7 is a graph showing a life cycle curve.

Figure 8:
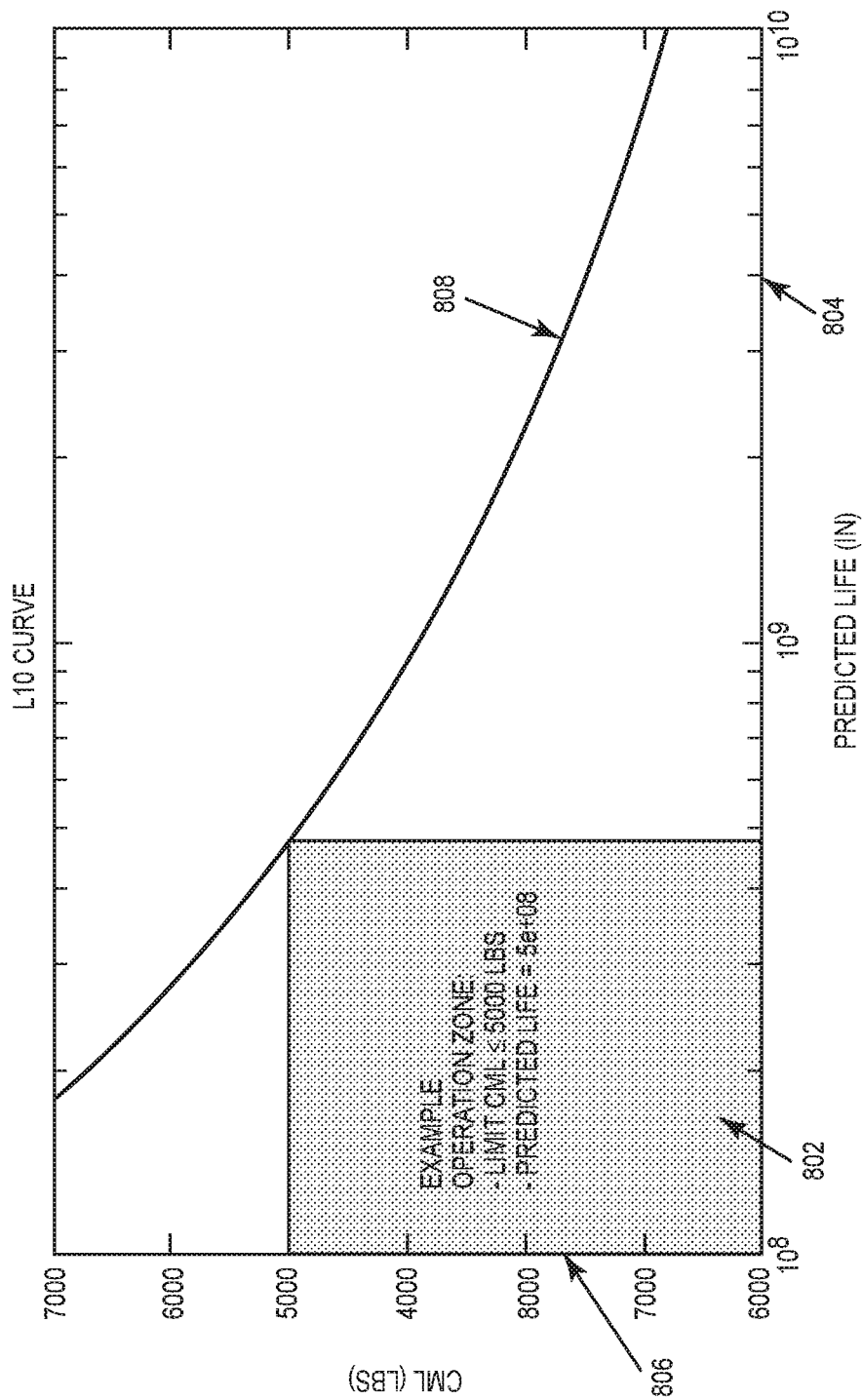

FIG. 8 is a graph showing actuator test results.

Figure 9:
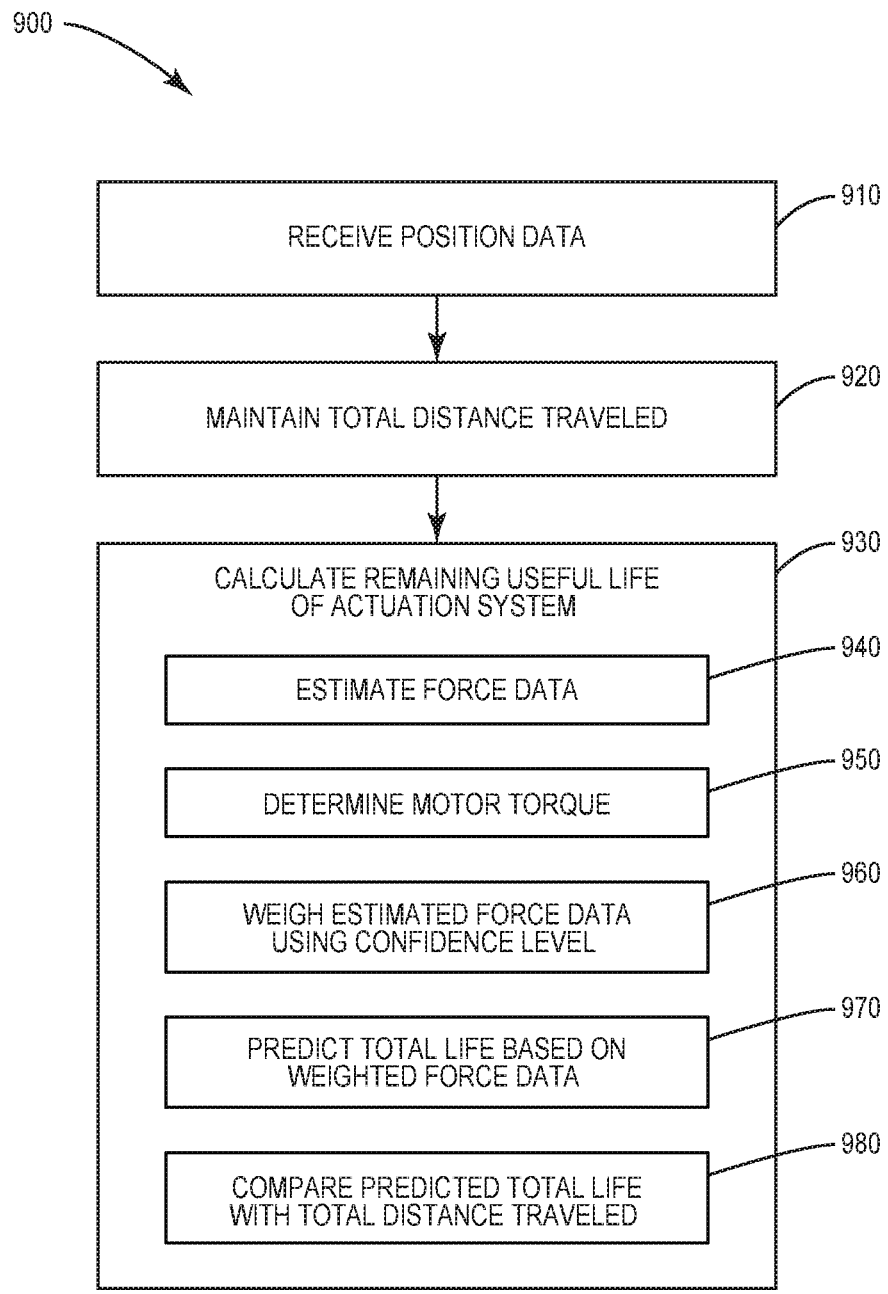

FIG. 9 is a flow chart of a method for monitoring remaining useful life of an actuation system.

Figure 10:
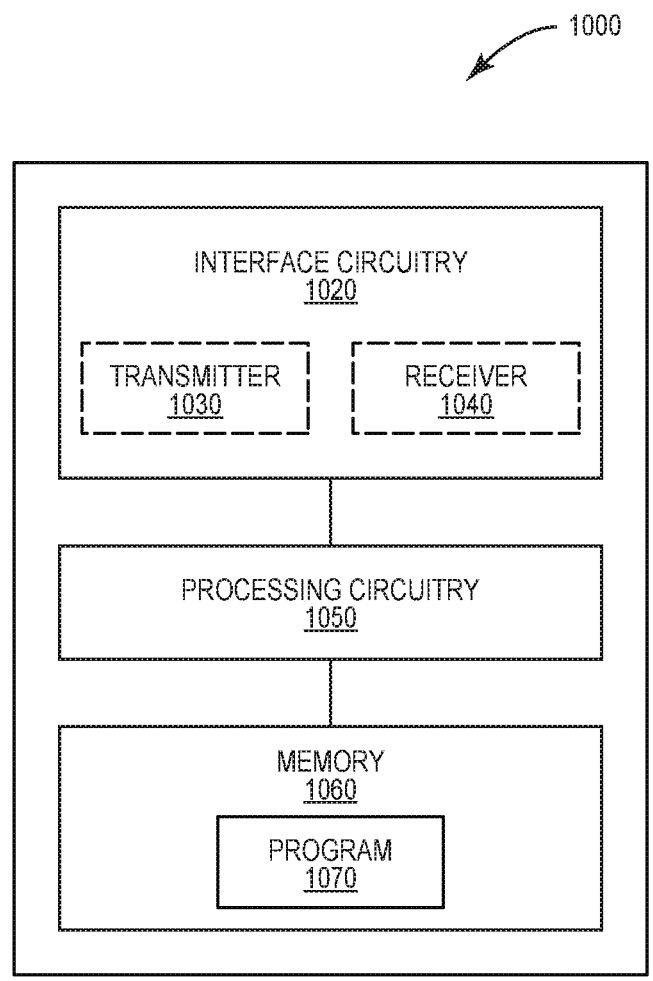

FIG. 10 is a block diagram of a system for monitoring remaining useful life of an actuation system.

DETAILED DESCRIPTION

There is a need to monitor and manage progressive changes in different health conditions of a ball screw actuator, such as lubrication starvation, preload loss, ball nut/screw profile wear, and re-circulation system failure. An adaptive feed forward compensation (AFFC) coupled with actuator health monitoring algorithm allows for the detection of anomalies, predict faults, and the ability to implement fault management. The AFFC approach uses Model Predictive Control (MPC) and Linear-quadratic-Gaussian (LQG) Control methods together with a position synchronization algorithm to provide good tracking and synchronizing the dynamic response of actuation systems and optimal control law—cost of control vs. stability. The RUL is designed to monitor the control surface position and determine the change in slew rate of the control surface. A reduction in the control surface slew rate can indicate an increase in friction within the ball screw or gearbox.

Throughout the life cycle of the ball screws, the total distance traveled is tracked from the beginning-of-life (BOL) to a point when the ball screw actuator has to be replaced. While on the ground, during equipment check test or scheduled maintenance, the ball screw actuator health monitoring test can be conducted to monitor the deterioration, anomalies, and/or impending faults in order to implement fault management. During the test, position (P) is monitored for every cycle and the total distance traveled ($D_{total}$) is tabulated. From the sampled position data, the other functional parameters are derived—the velocity (V), acceleration (A), time to full travel ($T_{full}$), and load (L).

The life expectancy of the ball screw actuator can be designated as L10, where life expectancy is calculated using a distance in millions of screw revolutions. Combining real-time cumulative mean load measurements of a position sensor with reliable theoretical ball screw L10 performance life cycle curves allows monitoring of the health and RUL of a ball screw actuator.

Friction between the ball nut and screw can affect the expected life of the ball screw. Monitoring the change of velocity of the position sensor and the time to full travel per cycle as the control surface moves through its range of operation allows detection of anomalies. Under normal conditions or when there are no anomalies, the velocity and time remain constant, taking into account acceptable velocity and time difference due to typical deterioration from use. However, when an anomaly arises, the time to full travel and maximum torque rise accordingly. During this time, the progression of the anomaly is monitored the severity is diagnosed by super-imposing the progression of time to full scale travel versus the L10 Life curve of the ball screw. In predicting the RUL, the progression is extrapolated until it intersects the L10 life curve. Likewise, knowing where the point of intersection is, the corresponding max load is projected.

FIG. 1 is an illustration of a system 100 for monitoring a ball screw actuator 102a. The ball screw actuator 102a is associated with a position sensor 106a. The system also includes and a computing device 108. In some embodiments, the computing device 108 can be separate devices, such as an onboard device to store the sensor data and a diagnostic device to calculate the RUL. In some embodiments, the computing device 108, the ball screw actuator 102a, and the position sensor 106a are all part of a single vehicle 104. In some embodiments, multiple ball screw actuators 102a are on the same vehicle 104. In FIG. 1, the vehicle is an aircraft, with the ball screw actuator 102a as part of an inboard flap. The ball screw actuator 102a can be driven electrically, hydraulically, or pneumatically.

As shown in FIG. 1, the system 100 monitors the RUL of the ball screw actuator 102a in the vehicle 104 using the position sensor 106a to determine position data of the ball screw actuator 102a. The computing device 108 maintains a record associated with the ball screw actuator 102a for the total distance traveled by the ball screw actuator 102a. The computing device 108 can calculate RUL for the ball screw actuator 102a by estimating force data, determining motor torque, weighing the estimated force data using a confidence level, predicting a total life of the ball screw actuator 102a based on the weighted force data, and comparing the predicted total life with the total distance traveled to determine the RUL of the ball screw actuator 102a.

In some embodiments, the received position data from the position sensor 106a is real-time position data. In some embodiments, the computing device 108 uses a Kalman estimator, described further below, to determine the RUL of the actuation system. For example, the confidence level can associated with a cubic mean load equation, also described in detail below, derived from the position data and the force data.

In some embodiments, as is shown in FIG. 1, there can be multiple ball screw actuators 102a-102d, each with a corresponding position sensor 106a-106d. Individual records for each ball screw actuator 102a-102d for total distance traveled by ball screw actuator 102a, total distance traveled by ball actuator 102b, and so on.

FIG. 2A is a ball screw system 200 with an internal ball return system 210. The ball screw system 200 includes a ball screw 202 and a ball nut 204, each with matching helical grooves, and at least one ball 206 which rolls between these grooves providing contact between the ball nut 204 and the ball screw 202. As the ball screw 202 or ball nut 204 rotates, the ball 206 is deflected by a deflector 208 into the internal ball return system 210 of the ball nut 204 and they travel through the internal ball return system 210 to the opposite end of the ball nut 204 in a continuous closed circuit 212. The ball 206 then exits from the internal ball return system 210 into the ball screw 202 and ball nut 204 thread raceways continuously to recirculate in the continuous closed circuit 212. In a ball screw system 200 with an internal ball return system 210, the balls 206 are returned through or along a nut wall 214, but below the outside diameter. In this type of return system, the balls 206 can be returned to the opposite end of the continuous closed circuit 212 through or along the nut wall 214, but below the outside diameter through a cap 216.

The ball nut 204 determines the load and life of the ball screw system 200. The ratio of the number of threads in the ball nut 204 circuit to the number of threads on the ball screw 202 can determine how much sooner the ball nut 204 will reach fatigue failure than the ball screw 202 will.

FIG. 2B is a ball screw system 250 with an external ball return system 260. The ball screw system 250 includes a ball screw 252 and a ball nut 254, each with matching helical grooves, and at least one ball 256 which rolls between these grooves providing contact between the ball nut 254 and the ball screw 252. As the ball screw 252 or ball nut 254 rotates, the ball 256 is deflected by a deflector 258 into the external ball return system 260 of the ball nut 254 and they travel through the external ball return system 260 to the opposite end of the ball nut 254 in a continuous closed circuit 262. The ball 256 then exits from the external ball return system 260 into the ball screw 252 and ball nut 254 thread raceways continuously to recirculate in the continuous closed circuit 262. In an external ball return system 260, the ball 256 is returned to the opposite end of the continuous closed circuit 262 through a ball return tube 266 which protrudes above the outside diameter of the ball nut 254.

As with the ball screw system 200 of FIG. 2A, the ball nut 254 determines the load and life of the ball screw 252. The ratio of the number of threads in the ball nut 254 circuit to the number of threads on the ball screw 252 can determine how much sooner the ball nut 254 will reach fatigue failure than the ball screw 252 will.

Normal ball screw failure modes are recirculating mechanism failure, bad lubrication, nut/screw groove profile wear and preload loss. Each failure mode has different failure impact distribution along ball screw system life cycle. The re-circulating part faults can happen at the very early stage of the whole life, and also at the late of the life, it can melt due to high temperature, or break down because of the inappropriate hit by the balls. Another concerned issue is the lubrication starvation. The sufficient lubrication not only reduces the groove surface friction, but also takes away some heat generated by the balls passing through orbit. The contact surface will be worn out after continuous movement, and then the surface-flaking or cracks appear when beyond the ball screw's life expectancy or under abnormal operation condition. The preload level will decrease after the ball screw's continuously running. Preload loss directly affects the ball screw stiffness and rigidity and therefore leads to component degradation and position loss.

The usable life of a ball screw assembly is usually validated in revolutions of travel under a specific load. This data is plotted in the form of theoretical ball screw L10 life (in millions of screw revolutions) curve. L10 life is achieved when 90% of identical ball screws achieve identical working conditions (alignment, axially and centrally applied load, speed, acceleration, lubrication, temperature and cleanliness).

The method provides the capability to derive the velocity, time to full travel per cycle, acceleration using a single position and map it to the corresponding load based on the ball screw L10 curve.

The L10 curve can be visualized as a load calibration curve for the selected ball screw actuator. A corresponding load on the load calibration curve combined with the change in time to full travel can be used to predict the RUL. Mapping of a ball screw actuator decrease in time to full travel versus the ball screw L10 curve allows a determination where such a decrease in time to full travel is an indicator that frictional loads are increasing to an unacceptable level.

To establish certainty that the anomaly is truly due to friction, and not to any other fault conditions; i.e. backlash, jam, etc., machine learning algorithms can be applied to create well-supervised machine learning models for different fault conditions. Therefore, in this particular case, when the above anomalous behavior satisfies that of the machine learning model for the frictional force, then the friction machine learning model would trigger.

FIG. 3 is a block diagram 300 of a load velocity estimator (LVE) 302. As shown, the LVE 302 can generate the RUL in an RUL device 304 by taking the command from a device such as the computing device 108 of FIG. 1 and the output measurement from a position sensor 106a to establish correlation between the real-time position 306a, force 306b, velocity 306c, and current 306d provided to the RUL device 304 by an output variable estimator (OVE) 308. The RUL device 304 and the OVE 308 are part of the LVE 302. The OVE 308 receives a command signal 306e from a controller 310 and a position 306f from a ball screw actuator 312. The position 306f is also transmitted to a load determiner 314.

The LVE 302 combines real-time position 306a, force 306b, velocity 306c, etc. to predict a reliable theoretical ball screw L10 performance life cycle curve. The LVE 302 can monitor the operational position measurement and determine the change in slew rate of the control surface.

The controller 310 can generate a series of health status test commands and take in the time series of position output measurements to estimate the missing state parameter, which is force (F). For the health monitoring, the OVE 308 takes the position 306f and outputs the derived monitors 306a-d. The OVE 308 calculates the time to maximum travel, total distance traveled from BOL, velocity, and acceleration. The OVE 308 takes in the control surface position and estimates the required state parameters, i.e., force. Using the derived force data and the measured position data, the force impedance ($F_I$) is calculated from the equation: $F_I = \Delta F / \Delta P$ Force at any time, T(n), can be calculated while the predicted force at a future time, T(n+x), can easily be extrapolated:

$$T(n):F(n)=\Delta P(n)*F_I(n).$$

$$T(n+x):F(n+x)=\Delta P(n+x)*F_I(n+x).$$

After a series of other data processing and analysis, the RUL device 304 can calculate RUL using the L10 life cycle curve. The current F(n) can be projected or extrapolated until the L10 Life cycle Curve Force and the extrapolated force are equal: F(n+x)=L10 Life cycle Curve F(n+x).

The corresponding total distance traveled where these curves intersect is at T(n+x) is $D_{total}$(n+x). Therefore, RUL=$D_{total}$(n+x)−$D_{total}$(n).

FIG. 4 is an LVE block diagram 400 with a Kalman estimator 402.

A Kalman estimator 402 can estimate unknown variables of interest based on a linear model. The linear model can describe the evolution on the estimated variables over time in response to model initial conditions as well as known and unknown inputs. Table 1 provides a glossary of acronyms used in the equations to follow describing the calculations processed in the LVE block diagram 400.

TABLE 1

| | |
|---|---|
| x | state vector |
| y | output |
| A | transition matrix |
| B | command matrix |
| C | observation matrix |
| w | process noise |
| v | observation noise |
| u | Input command |
| e | error |
| n | interval in time |
| K | Kalman gain |
| $x_e$(n) | estimated state vector at time interval n |
| $y_e$(n) | estimated output |
| $e_e$ | expected error |
| S | position |
| NDE | Net Drive Efficiency |
| ACR | Actuator Coupling Ratio |
| DLC | Dynamic Loading Constant |
| SL | Screw Lead |

The Kalman estimator 402 can be used to estimate actuator outputs: $y_{Motor\_Torque}$, $y_{Position}$, $y_{Motor\_RPM}$, $y_{Motor\_Current}$, and derive the Force, $F_e$, using the Kalman estimator 402 output variable $y_{Motor\_Torque}$. In some embodiments, the only variable measured by the system 100 provided to the LVE block diagram 400, position monitor actuator position. The motor torque variable is estimated by the Kalman estimator 402 in order to derive the force needed to define ball screw RUL. Using the state-space model representation of a linear system, the estimate of the position is calculated given noise and uncertainties to the system.

$$x(n+1)=Ax(n)+Bu(n)+w(n)$$

$$y(n)=Cx(n)+v(in)$$

$$x_e(n+1)=Ax_e(n)+Bu(n)+w(n)+K(y(n)-y_e(n))$$

$$y_e(n)=Cx_e(n)+v(n)$$

$$e_{e(n+1)}=x_{(n+1)}-x_{e(n+1)}=(A-KC)(x_{(n)}-x_{e(n)})$$

K minimizes the error between the measured values and the estimates.

$$e_{e(n+1)}=x_{(n+1)}-x_{e(n+1)} \text{ approaches zero}$$

If e is zero, then the estimated output $y_e$ is equal to y since x=$x_e$; hence, the estimated $F_e$ is equal to the true value F.

The RUL estimator 404 uses the position measurement, position sensor, and the estimated motor torque from the Kalman estimator 402 to define the ball screw RUL.

FIG. 5 is a graph 500 showing a duty cycle for a ball screw actuator. The exemplary duty cycle is generated by statistics and confidence intervals, such as control limits 506, 508. The graph 500 provides a plot of load as compared to time for a ball screw actuator. Load is shown in pounds on the x axis 502. Time is shown in seconds on the y axis 504. Confidence intervals are provided, as well. A confidence interval is a calculation that provides a likelihood of error. The top curve on the graph is an upper control limit 506 for the highest confidence interval. The bottom curve on the graph is a lower control limit 508 for showing the expected lowest confidence interval. The upper control limit 506 allows detection of a potential fault in the sensor or the diagnostic tool. The lower control limit 508 allows detection of a potential near failure of the ball screw actuator such as the ball screw actuator 102a of FIG. 1. A similar graph could be provided to a user when outputting the calculations of RUL from a computing device 108 as shown in FIG. 1. Any significant change in the position sensor can be plotted on dashboard or equivalent monitor and can be used to determine the RUL of a selected ball actuator.

FIG. 6 is a diagram 600 of the force on a ball screw actuator per distance traveled. As shown, an amount of force in pounds is provided in they axis while a number of inches is provided in the x axis. The diagram is for visual aid in describing an approach to determining a confidence interval. As shown in the diagram, s=position in inches and f=force in pounds. Since s is measurable, the total inches of travel is the summation of position measurements. Therefore, RUL=Predicted life−total distance traveled. Predicted life is calculated as (DLC/CML)3*SL*1e+06. DLC is a Dynamic Loading Constant while CIVIL is cubic mean load In some embodiments, the CIVIL is calculated as a confidence interval. The CIVIL is derived as follows:

$$CML = \sqrt[3]{\frac{F_1^3*S_1 + F_2^3*S_2 + F_3^3*S_3 + F_4^3*S_4 + F_n^3*S_n}{(S_1+S_2+S_3+S_4+S_n)}}$$

The estimated output of the LVE in the LVE block diagram 400 of FIG. 4 is the $y_{Motor\_Torque}$. Force can be calculated as $y_{Motor\_Torque}$*NDE*ACR.

FIG. 7 is an exemplary graph 700 showing a life cycle curve from a ball screw actuator supplier. The y axis 702 is the cubic mean load in pounds. The x axis 704 is distance in inches of travel. The operation zone 706 determines the maximum cubic mean load that the ball screw actuator should operate to meet specified life expectancy. For example, the life expectancy is 5*10^8 inches of travel. The L10 curve 708 is used to generate the RUL. In some embodiments, the L10 curve 708 can be the ball screw actuator load as compared to inches of travel. In some embodiments, the L10 curve 708 can be the velocity as compared to inches of travel or time to full travel. Since each failure mode has different failure impact distribution along ball screw system life cycle, it is important to predict the RUL of the ball screw actuators in order to perform the required maintenance or replacement of these units.

FIG. 8 is a graph showing actuator test results for an L10 Life Cycle Curve. As shown, the graph 800 provides an operation zone threshold 802, a limit cubic mean load of 4500 lbs. The x axis 804 is in inches of travel×10^8. The y axis 806 shows the cubic mean load in pounds. Continued increase in friction could reach a level where the system friction match the ball screw design load or operation zone of the ball screw actuator. At the end of the curve, near 6 million inches, the RUL margin safety for the ball screw has approached an unacceptable level.

FIG. 9 is a flowchart outlining further non-limiting methods according to present aspects and including a method 900 comprising receiving 910 position data of the actuation system from a position sensor. For example, the position sensor 106 of system 100 can provide information to the computing device 108 regarding the number of inches that the ball screw actuator 102 has traveled. The received position data can be real-time position data. The position data can be received continuously while the actuation system is in use.

The method further includes maintaining 920 a total distance traveled for the actuation system. For example, the computing device 108 can maintain a record of the total distance traveled for the actuation system. Likewise, the computing device 108 can maintain such a record for the actuation system. In some embodiments, the record can be maintained in multiple devices.

The method further includes calculating 930 the RUL of the actuation system. For example, the RUL can be calculated using the computing device 108. The RUL can be calculated while the actuation system is not in use.

In some embodiments, the calculating further includes 940 estimating force data using an output variable estimator. The calculating further includes 950 determining motor torque. The calculating can also include weighing 960 the estimated force data using a confidence level. In some embodiments, the determining motor torque and weighing the estimated force data are part of a Kalman estimator. In some embodiments, the confidence level is associated with a cubic mean load equation derived from the position data and the force data.

The calculating further includes predicting 970 a total life of the actuation system based on the weighted force data. In some embodiments, the calculating further includes comparing 980 the predicted total life of the ball screw actuator 102 with the total distance traveled to determine the remaining useful life. For example, the calculating further can further include injecting faults (e.g., backlash, high friction, etc.). The calculating can also further include determining a velocity based on the position data.

The method illustrated generally in FIG. 9 is non-limiting and further is intended to include the apparatuses and systems presented in at least one of FIGS. 1-4 and 10.

FIG. 10 illustrates an apparatus 1000 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The electronic device can be the computing device 108 of FIG. 1, such as a singular device on the vehicle or two separate devices, such as an onboard computing device and a diagnostic computing device. The apparatus may include one or more of each of a number of components such as, for example, processing circuitry 1050 (e.g., processor unit) connected to a memory 1060 (e.g., storage device).

The processing circuitry 1050 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 1060 (of the same or another apparatus).

The processing circuitry 1050 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 1060 is generally any piece of computer hardware that is capable of storing information such as, for example, data, computer programs (e.g., computer-readable program code 1070) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1060, the processing circuitry 1050 may also be connected to one or more interfaces for displaying, transmitting and/or receiving information. The interfaces may include a communications interface 1020. The communications interface 1020 may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like. The communications interface may have one or more transmitters 1030. The communications interface may have one or more receivers 1040.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 1000 may include a processing circuitry 1050 and a computer-readable storage medium or memory 1060 coupled to the processing circuitry, where the processing circuitry is configured to execute computer-readable program code 1070 stored in the memory. It will also be understood that one or more functions, and combinations of functions, may be implemented by special purpose hardware-based computer systems and/or processing circuitry s which perform the specified functions, or combinations of special purpose hardware and program code instructions.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

By the term "about" or "substantial" and "substantially" or "approximately," with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for monitoring remaining useful life (RUL) of an actuation system in a vehicle, the method comprising:
   receiving position data of the actuation system from a position sensor;
   maintaining a total distance traveled for the actuation system; and
   calculating the RUL of the actuation system, wherein the calculating comprises:
      estimating force data using an output variable estimator,
      determining motor torque,
      weighing the estimated force data using a confidence level,
      predicting a total life of the actuation system based on the weighted force data, and
      comparing the predicted total life with the total distance traveled to determine the RUL.

2. The method of claim 1, where the determining motor torque and weighing the estimated force data are part of a Kalman estimator.

3. The method of claim 2, wherein the confidence level is associated with a cubic mean load equation derived from the position data and the force data.

4. The method of claim 1, wherein the received position data is real-time position data.

5. The method of claim 4, wherein the position data is received continuously when the actuation system is in use.

6. The method of claim 5, wherein the RUL is calculated while the actuation system is not in use.

7. The method of claim 1, wherein the calculating further comprises injecting faults.

8. The method of claim 1, wherein the calculating further comprises determining a velocity based on the position data.

9. A system for monitoring remaining useful life (RUL) of an actuation system in a vehicle, the system comprising:
   a position sensor for determining position data of the actuation system; and
   a computing device for maintaining a total distance traveled for the actuation system; and
      calculating the RUL of the actuation system, wherein the calculating comprises:
   estimating force data,
   determining motor torque,
   weighing the estimated force data using a confidence level,
   predicting a total life of the actuation system based on the weighted force data, and
   comparing the predicted total life with the total distance traveled to determine the RUL.

10. The system of claim 9, where the computing device uses a Kalman estimator to determine the RUL of the actuation system.

11. The system of claim 10, wherein the confidence level is associated with a cubic mean load equation derived from the position data and the force data.

12. The system of claim 9, wherein the received position data is real-time position data.

13. The system of claim 9, wherein the vehicle with the actuation system further includes the position sensor and the computing device.

14. The system of claim 9, wherein:
   the vehicle comprises more than one actuation system,
   the vehicle comprises at least as many position sensors as actuation systems, and each of the more than one actuation system is associated with a different position sensor.

15. A computer-readable storage medium for monitoring remaining useful life (RUL) of an actuation system in a vehicle, the computer-readable storage medium being non-transitory and having computer-readable program code portions stored therein that in response to execution by a processor, cause an apparatus to at least:
receive position data from a position sensor of the actuation system;
maintain a total distance traveled for the actuation system;
calculate the RUL of the actuation system, wherein the calculating comprises:
estimate force data using an output variable estimator,
determine motor torque,
weigh the estimated force data using a confidence level, and
predict a total life of the actuation system based on the weighted force data, and
compare the predicted total life with the total distance traveled to determine the RUL.

16. The computer-readable storage medium of claim 15, where the determining motor torque and weighing the estimated force data are part of a Kalman estimator.

17. The computer-readable storage medium of claim 15, wherein the confidence level is associated with a cubic mean load equation derived from the position data and the force data.

18. The computer-readable storage medium of claim 15, wherein the received position data is real-time position data.

19. The computer-readable storage medium of claim 18, wherein the position data is received continuously when the actuation system is in use.

20. The computer-readable storage medium of claim 19, wherein the RUL is calculated while the actuation system is not in use.

* * * * *